2,451,991

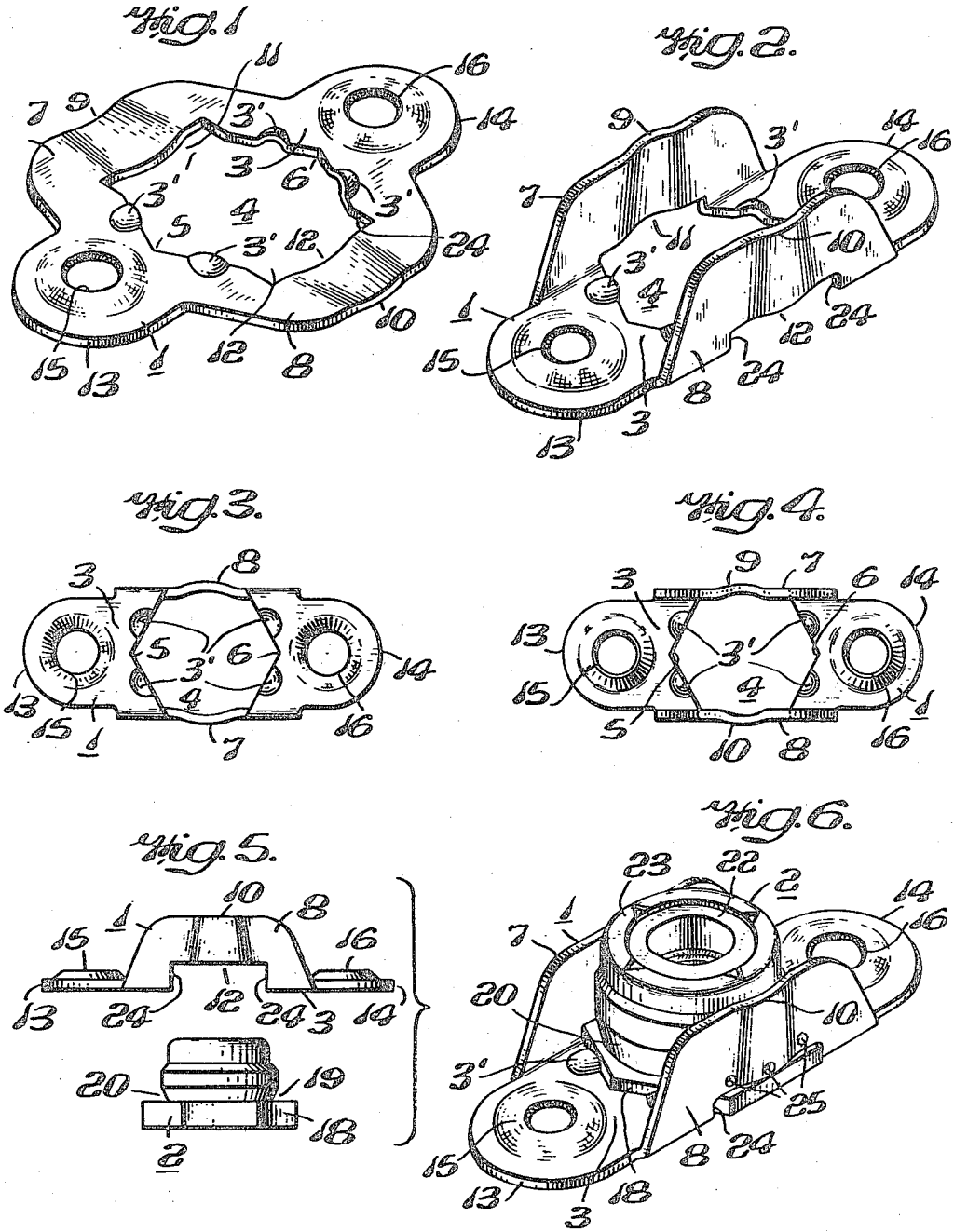
Oct. 19, 1948.  K. A. SWANSTROM  2,451,991
FASTENER
Filed July 26, 1944  2 Sheets-Sheet 1
INVENTOR.
KLAS ARENT SWANSTROM
BY
ATTORNEY

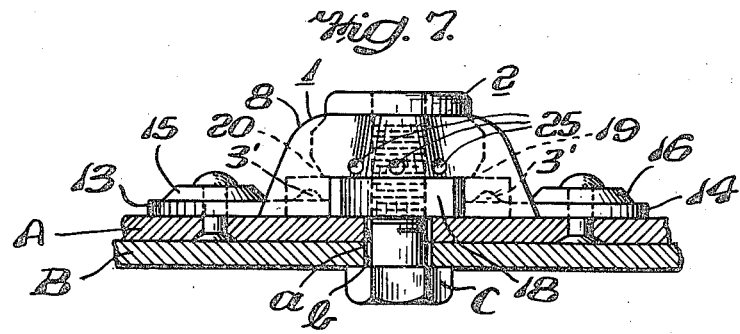
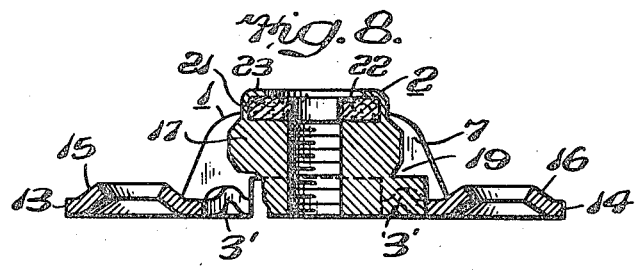
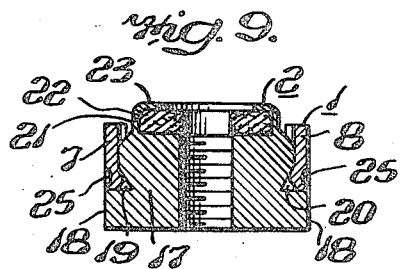
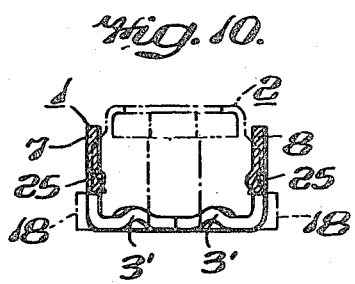
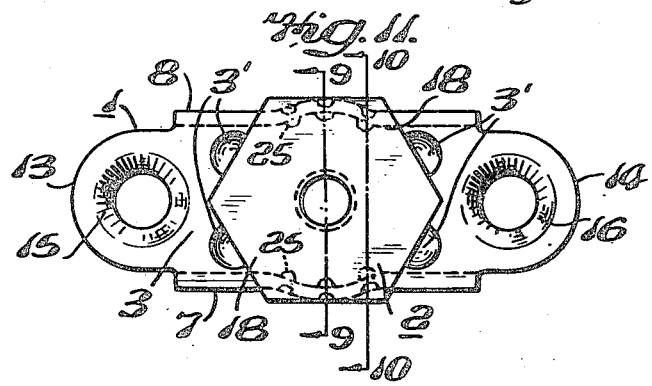
INVENTOR.
KLAS ARENT SWANSTROM Patented Oct. 19, 1948

UNITED STATES PATENT OFFICE 2,451,991

FASTENER

Klas Arent Swanstrom, Buckingham Township, Bucks County, Pa.

Application July 26, 1944, Serial No. 546,659

11 Claims. (Cl. 85—32)

My invention relates to fasteners and is primarily designed to provide improved means for holding a stop nut against rotation and for positioning it relative to a support for engagement by a bolt by which the nut may be drawn into direct and firm abutting engagement with the support.

Such means comprises a retainer having an apertured base in which a stop nut, preferably having a polygonal flange, is held non-rotatably but in which it is movable axially under control of positioning means, preferably comprising resilient walls bent up from the base and containing recesses forming seats for the nut flange.

The fastener may be stamped from thin sheet material, which is preferably embossed around the edge of the aperture in the retainer base so as to provide bearing surfaces for the nut flange of substantially greater depth than the thickness of the sheet material so that slight axial movement of the nut will not disengage its flange from the fastener base.

The side walls are preferably bulged in to form a frustum seat for the body of the nut, and such seat and nut body may be provided with interlocking means, such as a groove and detents.

By my improvements I provide a fastener having a retainer which may be readily and inexpensively made and into which a stop nut may be easily snapped and securely held without tools or expensive assembly operations.

The characteristic features and advantages of my improvements will further appear from the following description and the accompanying drawings in illustration thereof.

In the drawings, Fig. 1 is a perspective view of a stamped blank of sheet material from which the retainer element of my improved fastener may be formed; Fig. 2 is a perspective view of the blank shown in Fig. 1 bent to form a retainer; Fig. 3 is a bottom plan view of the retainer shown in Fig. 2; Fig. 4 is a top plan view of the retainer shown in Fig. 2; Fig. 5 is an exploded view showing, in side elevation, the retainer shown in Figs. 1 to 4 with a flanged stop nut positioned for insertion in such retainer; Fig. 6 is a perspective view of the assembled retainer nut; Fig. 7 is a part sectional view showing my improved fastener with its retainer riveted to a structural member and the nut engaged by a bolt for securing a plate or the like to the structural member; Fig. 8 is a longitudinal sectional view of my improved fastener with parts broken away; Fig. 9 is a transverse sectional view taken approximately on the line 9—9 of Fig. 11; Fig. 10 is a transverse sectional view taken approximately on the line 10—10 of Fig. 11 with the nut in dotted lines; and Fig. 11 is a bottom view of my improved fastener with the nut in assembled position in the retainer.

As illustrated in the drawings, my invention comprises a fastener consisting of a retainer 1 and a nut 2. The retainer has a base 3 containing a polygonal aperture 4, the ends of which are bounded and defined by edges which diverge oppositely toward points 5 and 6. These edges are embossed to form upwardly projecting concavoconvex bosses or pimples 3' forming bearings of substantially greater depth than the thickness of the sheet material from which the retainer is formed.

Side walls 7 and 8 are bent transversely to the base 3 into substantially parallel relation to one another so as to form a channel-like structure.

The side walls 7 and 8 are provided with concavo-convex bulges 9 and 10 tapering toward the top of the side walls 7 and 8 and forming a frustoconical seat for a nut. The bottoms of the side walls 7 and 8 are cut away, adjacent to the aperture 4, to form recesses 11 and 12 in the side walls communicating with and complementary to the aperture 4. The base 3 may be provided with end lugs 13 and 14 projecting beyond the side walls 7 and 8 and preferably containing concavoconvex protuberances 15 and 16 by which the base 3 may be anchored to a suitable support by riveting or welding.

A fastener as above described may be conveniently formed by stamping and embossing a blank from sheet material, such as metal, fibre or plastic, as shown in Fig. 1; the blank being preferably cut and embossed in a single blow, and the side walls 7 and 8 being thereafter bent transversely to the base 3 and to the lugs 13 and 14 along lines substantially coincident with the side edges of the lugs 13 and 14 and intersecting the openings 4, 11 and 12 in the blank and preferably so that the tops of the recesses 11 and 12 in the bent walls lie slightly above the top surface of the base 3.

The stop nut 2 has an axially threaded body 17 (Fig. 8) having at one end thereof a polygonal base or flange 18 (Figs. 5 and 6), extending radially from the periphery of the body. The latter has a section 19 converging downwardly toward the top of the base 18 to form a peripheral groove 20, (Figs. 5, 9). The opposite end of the body 17 contains a recess 21 (Fig. 9) for an unthreaded locking collar 22 which is held in place by the overturned staked lip 23 and extends inwardly slightly beyond the root of the thread of the nut, The body of the nut 2 is of smaller diameter than the aperture 4 and may be pushed therethrough into yielding engagement with the resilient walls 7 and 8 of the fastener until the projecting base 18 engages the tops of the recesses 11 and 12 in the side walls. The shape of the base 18 is made to conform to the contour and size of the aperture 4 so as to make a close slip fit therein. The edges of the base 18 are seated against the embossed edges surrounding the aperture 4 and is held against rotary movement by such engagement and by the engagement of the side projections of the base with the vertical walls 24 of the recesses 11 and 12.

The resiliency of the walls 7 and 8 and the frustoconical shape of the seat formed by the bulges 9 and 10 yieldingly resists axial movement of the nut and imparts an increasing resistance to the thrust imposed on the nut by screwing a bolt therein. The axial movement of the nut in one direction is further limited by the engagement of the flanged base 18 with the tops of the recesses 11 and 12. The axial displacement of the nut may be further hindered by embossing in the walls 7 and 8 the detents 25 which engage in the groove 20.

When a nut has been inserted in the fastener so that its base 18 is seated in the aperture 4, the lugs 13 and 14 are riveted or welded to an apertured support or structural member A so that the axis of the nut thread is substantially coincident with the axis of the aperture a in the member A. An apertured plate or other member may be then securely attached to the member A by inserting a threaded bolt C through the apertures b and a and screwing it into the nut 2.

Having described my invention, I claim:

1. A fastener comprising a retainer formed of sheet material and having a base containing an aperture, a nut seated in and movable axially in said aperture and making a close slip fit with the wall thereof, and means axially positioning said nut with respect to said base.

2. A fastener comprising a retainer having a base containing an aperture, said base having an embossed edge defining said aperture, a nut seated in and movable axially through said aperture, and resilient means axially positioning said nut with respect to said base.

3. A fastener comprising a retainer having an apertured base, resilient walls bent transversely to said base, and a nut having a base of greater width than the space between said walls and seated in and movable through the aperture in said retainer base, said nut being positioned relatively to said base by said resilient walls which are flexed by said nut in seating said nut base in said aperture.

4. A fastener comprising a retainer having an apertured base and side walls bent transversely to said base and containing apertures complementary to and communicating with the apertures of said base, and a nut seated in the apertures of said base and walls, said walls limiting the axial movement of said nut.

5. A fastener comprising a retainer having a base and side walls bent transversely to said base, said side walls having bulges forming a frusto conoidal seat and a nut in said seat, said bulges having an axis of curvature transverse to said base.

6. A fastener element comprising a retainer having an apertured base, said base having an embossed edge defining said aperture, and side walls bent transversely to said base and containing slots communicating with said base aperture.

7. A fastener element comprising a retainer having a base and side walls transversely thereto, said side walls having complementary concavo-convex bulges forming a frusto conoidal seat.

8. A fastener element comprising a retainer having a base containing a polygonal aperture, said base having an embossed edge defining said aperture, and side walls bent transversely to said base and containing a recess communicating with the aperture in said base, said side walls having concavo-convex bulges therein forming a frusto conoidal seat.

9. A fastener comprising a channel-like retainer having a base and side walls, said base and walls containing communicating complementary apertures, and a nut seated in said apertures.

10. A fastener comprising a retainer having a base containing an aperture and resilient side walls extending along said aperture, and a nut seated in said aperture and flexing and yieldingly gripped by said side walls, said base including attaching lugs the relative stressing of which does not flex said side walls.

11. A nut anchor made of a single piece of resilient sheet material comprising a base having an opening for the passage of a nut, the material of the base being bowed upwardly without severence in regions on opposite sides of the nut opening and adjoining such opening to provide end surfaces adapted to engage the nut to prevent the nut rotating relative to the base, a pair of opposed spring wings carried by the base and adapted to yieldingly engage shoulders on the nut, the upwardly bowed portion and the wings alternating in position about the axis of the nut.

KLAS ARENT SWANSTROM.

REFERENCES CITED

The following references are of record in the file of this patent:

UNITED STATES PATENTS

| Number | Name | Date |
|---|---|---|
| 1,046,914 | Webb | Dec. 10, 1912 |
| 1,272,919 | Crawford | July 16, 1918 |
| 2,095,271 | Swanstrom | Oct. 12, 1937 |
| 2,243,923 | Swanstrom | June 3, 1941 |
| 2,304,107 | Leisure | Dec. 8, 1942 |
| 2,339,130 | Albin | Jan. 11, 1944 |
| 2,391,046 | Tinnerman | Dec. 18, 1945 |